(12) United States Patent
Moore et al.

(10) Patent No.: US 8,016,233 B2
(45) Date of Patent: Sep. 13, 2011

(54) AIRCRAFT CONFIGURATION

(75) Inventors: Matthew D. Moore, Everette, WA (US);
Kelly L. Boren, Arlington, WA (US);
Edward C. Marques, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 474 days.

(21) Appl. No.: 11/307,271

(22) Filed: Jan. 30, 2006

(65) Prior Publication Data

US 2007/0176047 A1 Aug. 2, 2007

(51) Int. Cl.
*B64C 1/00* (2006.01)

(52) U.S. Cl. .......... 244/119; 244/117 R; 244/54; 244/55

(58) Field of Classification Search ................ 244/45 R, 244/54, 55, 119, 129.1, 117 R, 4 R
See application file for complete search history.

(56) References Cited

U.S. PATENT DOCUMENTS

| | | | | |
|---|---|---|---|---|
| 2,390,859 A | * | 12/1945 | Warner | 244/15 |
| 2,469,619 A | * | 5/1949 | Warner | 244/15 |
| 2,846,165 A | | 8/1958 | Axelson | 244/90 R |
| 2,863,620 A | * | 12/1958 | Vautier | 244/15 |
| 3,310,262 A | * | 3/1967 | Robins et al. | 244/45 R |
| 3,576,300 A | | 4/1971 | Palfreyman | |
| 3,727,862 A | * | 4/1973 | Kaufhold et al. | 244/54 |
| 3,830,451 A | * | 8/1974 | Fosness | 244/207 |
| 3,936,017 A | | 2/1976 | Blythe et al. | |
| 4,019,699 A | | 4/1977 | Wintersdorff et al. | |
| 4,036,452 A | | 7/1977 | Schairer | |
| 4,093,156 A | * | 6/1978 | Coe, Jr. | 244/45 A |
| 4,171,786 A | | 10/1979 | Krenz | |
| 4,311,289 A | | 1/1982 | Finch | |
| 4,447,022 A | * | 5/1984 | Lion | 244/13 |
| 4,449,680 A | | 5/1984 | Gratzer et al. | |
| 4,767,083 A | * | 8/1988 | Koenig et al. | 244/12.3 |
| 4,828,203 A | * | 5/1989 | Clifton et al. | 244/12.3 |
| 4,836,469 A | | 6/1989 | Wagenfeld | |
| 5,034,751 A | * | 7/1991 | Miller, Jr. | 342/368 |
| 5,348,256 A | * | 9/1994 | Parikh | 244/208 |
| 5,495,999 A | * | 3/1996 | Cymara | 244/45 A |

(Continued)

OTHER PUBLICATIONS

Meyer Reshotko, Jack H. Goodykoontz and Robert G. Dorsch, "Engine-Over-the-Wing Noise Research", J. Aircraft, Apr. 1974, pp. 195-196, vol. 11, No. 4.

(Continued)

*Primary Examiner* — Tien Dinh
*Assistant Examiner* — Philip J Bonzell
(74) *Attorney, Agent, or Firm* — Moore & Van Allen PLLC; Matthew W. Witsil (57) ABSTRACT

An aircraft configuration that may reduce the level of noise, infrared radiation, sonic boom, or combination thereof directed towards the ground from an aircraft in flight. In accordance with an embodiment of the present invention, an aircraft includes a tubular fuselage, two delta wings, at least one engine mounted to the aircraft and higher than the wings, and vertical stabilizers mounted on each wing outboard of the outermost engine. Each wing may include a wing strake at the leading edge of the wing and extending to the fuselage and an aft deck. The leading edge of the wing may extend forward of the intake of the engine, and the trailing edge of the aft deck may extend aft of the engine exhaust. The aft deck may include an upwardly rotatable pitch control surface at the trailing edge of the deck.

50 Claims, 10 Drawing Sheets

U.S. PATENT DOCUMENTS

| | | | |
|---|---|---|---|
| 5,529,263 A * | 6/1996 | Rudolph | 244/55 |
| 5,738,298 A | 4/1998 | Ross et al. | |
| 5,842,666 A * | 12/1998 | Gerhardt et al. | 244/15 |
| 5,899,409 A | 5/1999 | Frediani | |
| 6,102,328 A * | 8/2000 | Kumata et al. | 244/45 R |
| 6,308,913 B1 | 10/2001 | Fujino et al. | |
| 6,532,729 B2 * | 3/2003 | Martens | 60/204 |
| 6,575,406 B2 * | 6/2003 | Nelson | 244/119 |
| 6,817,571 B2 * | 11/2004 | Retz et al. | 244/15 |
| 6,824,092 B1 * | 11/2004 | Franklin et al. | 244/1 N |
| 6,843,450 B2 * | 1/2005 | Bath et al. | 244/131 |
| 6,921,045 B2 * | 7/2005 | Chang et al. | 244/15 |
| 6,929,216 B2 * | 8/2005 | Bath et al. | 244/45 A |
| 2003/0052228 A1 * | 3/2003 | Sankrithi | 244/119 |
| 2004/0007647 A1 * | 1/2004 | Dong et al. | 244/165 |
| 2007/0023571 A1 * | 2/2007 | Kawai et al. | 244/119 |

OTHER PUBLICATIONS

"Noise-Reduction Benefits Analyzed for Over-the-Wing-Mounted Advanced Turbofan Engine (Synopsis)", www-paso.grc.nasa.gov/Library/Abstracts/berton6.hmtl, Jan. 20, 2006, pp. 1-2.

Mizrahi, "Flight to the Future", Jan. 20, 2006, www.twitt.org/bldwing.htm, pp. 1-9.

"Stealth Aircraft the Technology behind the planes", www.seorf.ohiou.edu, Jan. 20, 2006, pp. 1-12.

Geoffrey A. Hill and Russell H. Thomas, "Challenges and Opportunities for Noise Reduction Through Advanced Aircraft Propulsion Airframe Integration and Configurations", $8^{th}$ CEAS Workshop: Aeroacoustics of New Aircraft and Engine Configurations, Budapest, Hungary, 2004, pp. 1-13.

Matthew D. Moore, et al., U.S. Appl. No. 11/612,594; non-final Office Action, dated Jan. 26, 2009.

Matthew D. Moore, et al., U.S. Appl. No. 11/612,594; final Office Action, dated Oct. 13, 2009.

Matthew D. Moore, et al., U.S. Appl. No. 11/612,594; Advisory Action, dated Dec. 29, 2009.

Matthew D. Moore, U.S. Appl. No. 11/612,594, filed Dec. 19, 2006; Non-Final Office Action, dated Mar. 17, 2010.

* cited by examiner

AIRCRAFT CONFIGURATION

FIELD OF THE INVENTION

This invention relates to the field of aircraft design, and more particularly to an airplane configuration in which an engine is wholly above a wing and between vertical tails.

BACKGROUND

Aircraft engines generate sound and heat in their operation. Excessive sound is undesirable largely because of disturbance to surrounding communities. Heat is undesirable particularly in both military and civil aircraft, which may be tracked by ground-based missiles that seek heat in the form of infrared radiation. The design of the aircraft profoundly impacts the sound and heat that are observed from the ground.

Conventional subsonic civil aircraft designs commonly feature engine placement underneath the airplane's wings. Conventional supersonic military aircraft designs commonly feature engine placement in the aft-most portion of the airplane with the nozzles extending aft of the wing and control surfaces. The sound pressure level produced by the engines, herein generally referred to as noise, and particularly jet noise or the "roar" heard at takeoff, travels largely unabated to communities. For under-wing engine installations this noise is amplified by the under-surface of the wing because the portion of the sound produced by the engines that would otherwise radiate upward is reflected downward off of the under-surface. The jet plume interacts with the wing trailing edge. Both the under-surface reflection and the jet plume interaction with the wing trailing edge add to the overall noise heard below. Even when engines are located higher than wings, aircraft generally offer little in the way of impeding the downward travel of sound due to the absence of a surface the covers a substantial extent of the downward sound propagation path. Technological improvements in engines have resulted in a gradual reduction of engine noise over time, but further reductions based on similar improvements will likely be minimal.

Heat similarly radiates from aircraft engines. Both military and civil aircraft must now contend with hostile environments that may include man-portable air defense systems (MANPADS). Some conventional airplane designs having the engines mounted beneath the wings, or the exhaust at the rear end of the aircraft, radiate heat unimpeded to the ground. This issue is exacerbated by the conventional under-wing mount, because radiant heat energy also reflects off the pylon and underside of the wing, much like noise energy. Countering the looming threat of heat-seeker missiles to transport aircraft operating in hostile airspace can involve two approaches. First, self-defense countermeasure systems may be added to the aircraft. Second, the observability of the major contributors to heat signature may be reduced. With respect to some countermeasures employments, the under-wing engine installation could interfere with the optimum countermeasure device placements. Furthermore, the jet plume can interact with the wing trailing edge in a way that splits or spreads the exhaust plume, potentially increasing vulnerability of aircraft outfitted with self-defense countermeasure systems. Currently available technologies that sufficiently reduce the observability of the heat signature in complement with self-defense systems generally have negative impact on performance, have limited safety improvement, and are expensive.

In the case of supersonic aircraft, the propulsion system also contributes to the sonic boom produced during supersonic flight. Reduction of sonic boom from typical levels is widely believed to be necessary for regulators to ever accept civil supersonic flight. The characteristic N-wave of a sonic boom is created both by shockwaves produced at the fore and aft regions of the aircraft. Strides have been made at reducing fore shocks. An appreciable reduction in sonic boom annoyance, however, cannot be realized without reduction of both fore and aft shocks, a portion of which is typically produced by the propulsion system.

SUMMARY OF THE INVENTION

In accordance with an embodiment of the present invention, an aircraft includes a tubular fuselage, two delta wings, at least one engine mounted to the aircraft and higher than the wings, and vertical stabilizers mounted on each wing outboard of the outermost engine. Accordingly, the present invention may reduce the level of noise, infrared radiation, or both directed towards the ground from an aircraft in flight.

In accordance with another embodiment of the present invention, an aircraft includes a tubular fuselage, two delta wings, each with a wing strake at the leading edge of the wing and extending to the fuselage, a plurality of engines mounted to the aircraft wholly above the wings, vertical stabilizers mounted on each wing outboard of the outermost engine, and an aft deck. Each vertical stabilizer extends at least as high as the central axis of the highest engine, at the lowest point of that engine, and the vertical stabilizers further extend from the leading edge to the trailing edge of the wing. The aft deck includes an upwardly rotatable pitch control surface at the trailing edge of the deck.

In accordance with another embodiment of the present invention, a method of making an aircraft with reduced aircraft noise, infrared radiation, or both, emitted towards the ground from the aircraft in flight is provided. The method includes mounting an engine to the aircraft above a wing. The engine includes a nacelle and the wing extends forward of the inlet of the nacelle and aft of the exhaust of the nacelle a distance at least as great as the vertical distance between the upper surface of the wing and the top of the nacelle. An aft deck is provided that extends from the wing and includes a trailing edge extending aft of the exhaust of the nacelle a distance at least as great as the vertical distance between the upper surface of the wing and the top of the nacelle.

The features, functions, and advantages can be achieved independently in various embodiments of the present invention or may be combined in yet other embodiments.

DETAILED DESCRIPTION OF THE INVENTION

The following detailed description of preferred embodiments refers to the accompanying drawings that illustrate specific embodiments of the invention. Other embodiments having different structures and operations do not depart from the scope of the present invention.

In the Figures herein, unique features receive unique reference numerals, while features that are the same in more than one drawing receive the same reference numerals throughout. The scope of the invention is not intended to be limited by materials, but may be carried out using any materials that allow the construction and operation of the present invention. Materials and dimensions depend on the particular application. The present invention may be used for any aircraft, whether private, commercial, or military, of any size.

Figure 1:
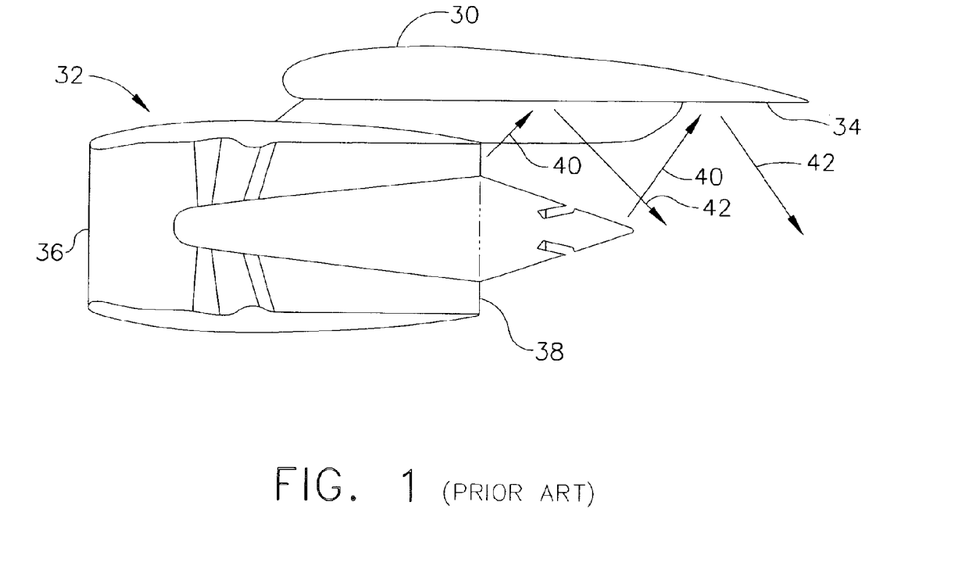
FIG. 1 is a cross-section view of a prior art wing and engine configuration.
Figure 2:
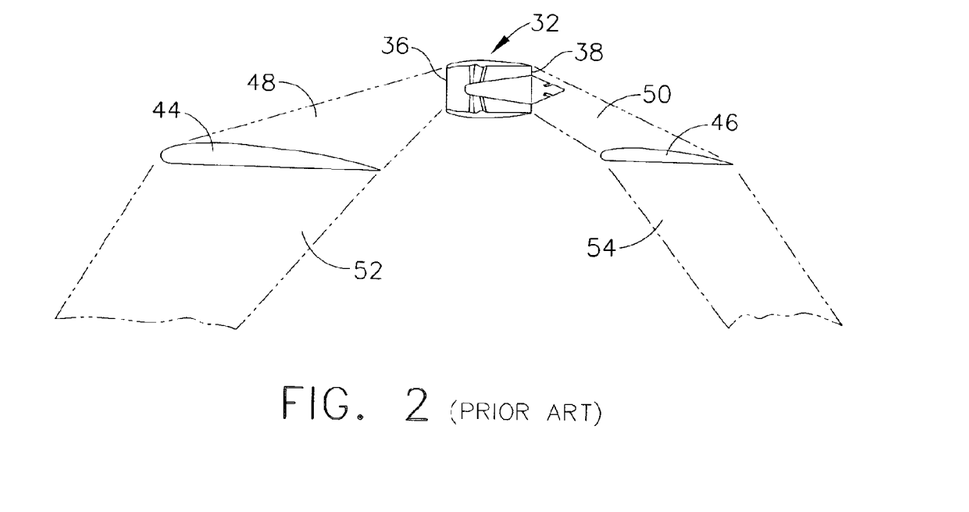
FIG. 2 is a cross-section view of another prior art wing and engine configuration.

Referring to the drawings, FIG. 1 shows a cross-section of a wing 30 and engine 32 showing a prior art configuration with the engine 32 mounted to the underside 34 of the wing 30. In addition to the unimpeded path of noise and heat, or infrared radiation, to the ground from both the intake 36 and exhaust 38 of the engine, sound and heat are directed 40 to the underside 34 of the wing 30 and are reflected 42 downward, increasing the noise and heat that are observed from the ground. FIG. 2 shows a prior art wing and engine 32 configuration where the engine 32 is mounted to the fuselage of the airplane higher than the wings 44, 46, which are fore and aft of the engine 32. Portions of the noise and heat 48, 50 emitted by the engine are blocked from the ground by the wings 44, 46. Shadow zones 52, 54 result from the wings 44, 46 blocking noise and heat, but the shadow zones 52, 54 provide relatively little impedance to noise and sound in that the wings 44, 46 do not extend below either the intake 36 or the exhaust 38 of the engine.

Figure 3:
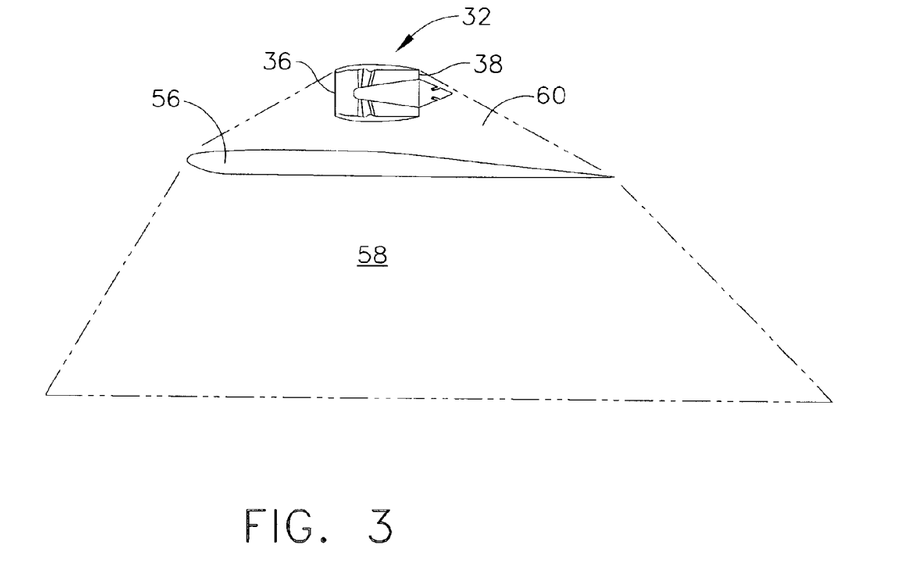
FIG. 3 is a cross-section view of a wing and engine configuration in accordance with an embodiment of the present invention.
Figure 4:
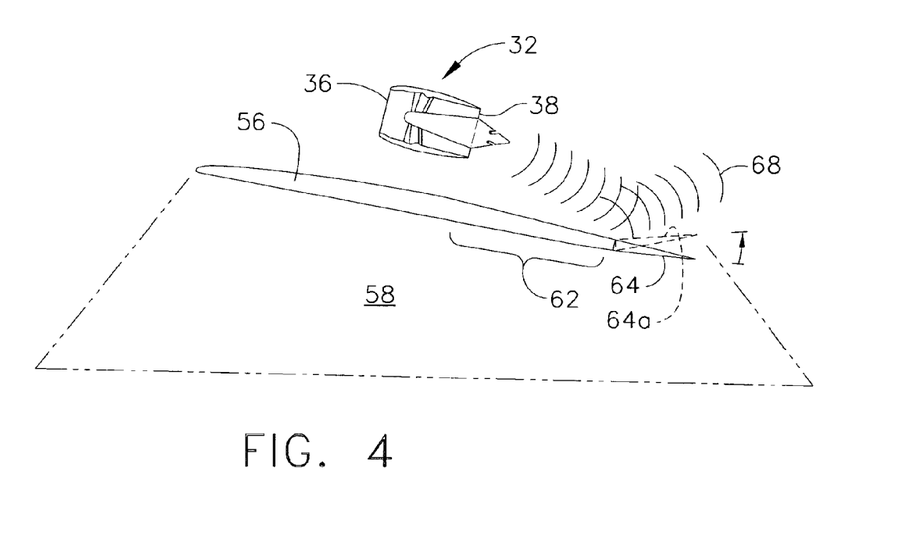
FIG. 4 is a cross-section view of a wing, aft deck, and engine configuration in accordance with an embodiment of the present invention.
Figure 5:
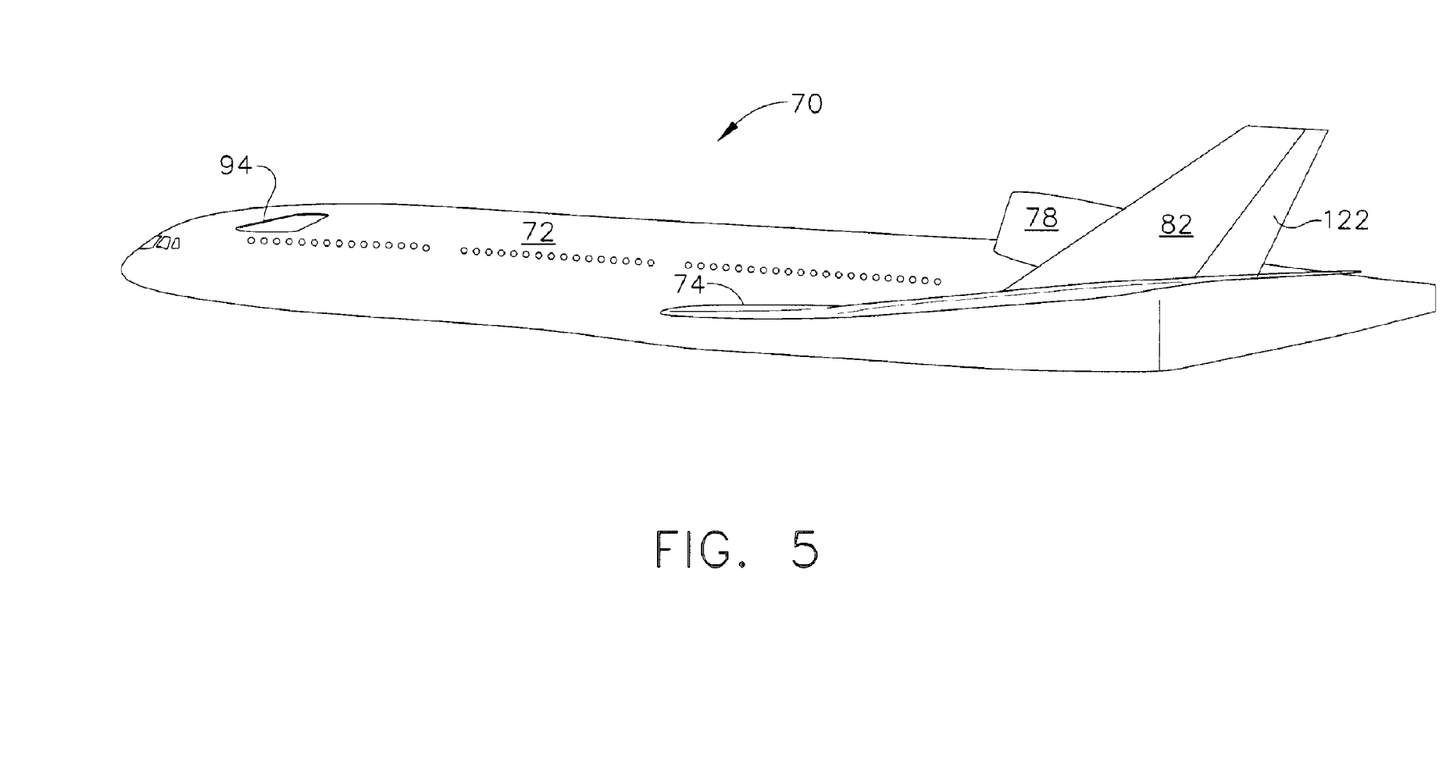
FIG. 5 is a side elevation view of an airplane in accordance with an embodiment of the present invention.

FIG. 3 shows an engine and wing configuration in accordance with the present invention, where the engine 32 is located above the wing 56. The wing 56 may extend fore and aft of the engine 32 to create a shadow zone 58 that is continuous, with rearward, underneath, and forward shielding of noise and heat 60 from the ground. FIG. 4 shows another configuration that may be part of the same aircraft as FIG. 3, where the wing 56 may extend to an aft deck 62. At the trailing end of the aft deck 62 there may be an upwardly rotatable pitch control surface 64. This pitch control surface 64 may be rotated to an upward position upwardly rotated pitch control surface 64a extends the shadow zone 58 and deflects noise and heat energy 68 upward when the wing 56 and aft deck 62 are at an upward angle as shown, as in takeoff and approach.

FIGS. 5-10 are views of an embodiment of an aircraft 70 in accordance with the present invention. The aircraft 70 may include a tubular fuselage 72, a pair of wings 74, 76 in a delta wing configuration, a pair of engines 78, 80, a pair of vertical stabilizers 82, 84, an aft deck 86, 88 on each side of the fuselage 72 with pitch control surfaces 90, 92, and a pair of canards 94, 96. The aircraft design shown in FIGS. 5-10 is for a subsonic aircraft, but many of same features apply to transonic and supersonic aircraft.

The tubular fuselage 72, shown as circular in cross-section, may be circular, elliptical, or other aerodynamic shape. Sections may be area-ruled as needed. Area-ruling is a technique used to mitigate drag of transonic and supersonic designs, wherein the fuselage may be gradually narrowed at a central portion. The amount of narrowing required for wave drag reduction is proportional to the frontal area of contribution of the propulsion system. An elliptical cross-section may increase the width of the fuselage 72, allowing more seats in each row, and in turn permits more passengers to be accommodated than with a circular cross-section. Accordingly, an elliptical shape permits the same number of passengers as a circular cross-section within a shorter length of passenger compartment. This adds to available space for cargo at the rear of the aircraft 70 or provides for reduction of the length of the aircraft 70, and possibly eliminates the need to have passenger emergency egress on top of the delta wings 74, 76. An elliptical cross-section also allows main landing gear stowage without the need for heavy, drag inducing wing-to-body fairings.

The engines 78, 80 may be mounted above the delta wings 74, 76. In one embodiment, the engines 78, 80 may be mounted to the wings 74, 76 with vertical struts or pylons. Aerodynamic integration of engines wholly mounted over large surfaces, and in particular to wings, however, can be difficult due to the interaction of the flow with the upper wing surface, strut, and nacelle. Higher speeds exacerbate these effects. In the embodiment shown, the engines 78, 80 are mounted to the fuselage 72 with structural members 98, 100. The position of the engines 78, 80 above the wings 74, 76 and not connected to the wings 74, 76 allows air over the wings 74, 76 to pass freely. This may maximize lift production of the wings 74, 76 without undue interference from the engines 74, 76. A boundary layer, which is the flow adjacent to the wing surface that is less than 99% of the free stream flow, forms on top of the wing 74, 76, and the engine 78, 80 does not intersect this boundary layer.

There may be a "close-out" of the fuselage 72 forward of the engines 78, 80 allowing supports 98, 100 for the fuselage-mounted engines 78, 80 to pass through the fuselage 72. This may provide structural benefits such as may be realized from, for example, connecting the supports 98, 100 for the engines 74, 76 to each other or to other structural members within the fuselage 72. As an alternative, there may be only one engine, mounted on the top of the fuselage 72 and still longitudinally located such that the wings 74, 76 are outboard of the engine. Or, additional engines could be provided so that there is, for example, a pair of engines on each side of the fuselage 72.

Figure 6:
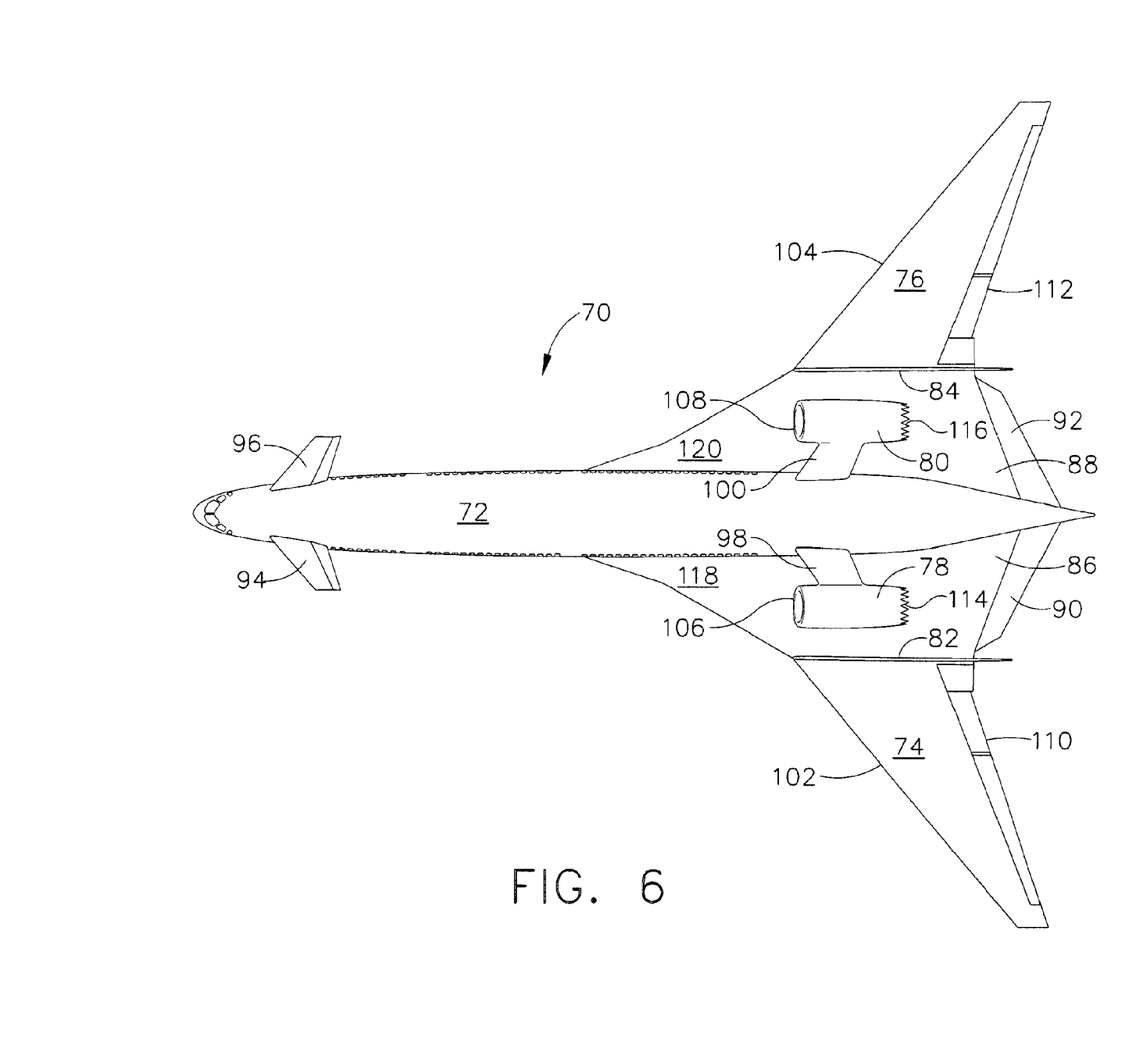
FIG. 6 is a top plan view of the airplane of FIG. 5.
Figure 7:
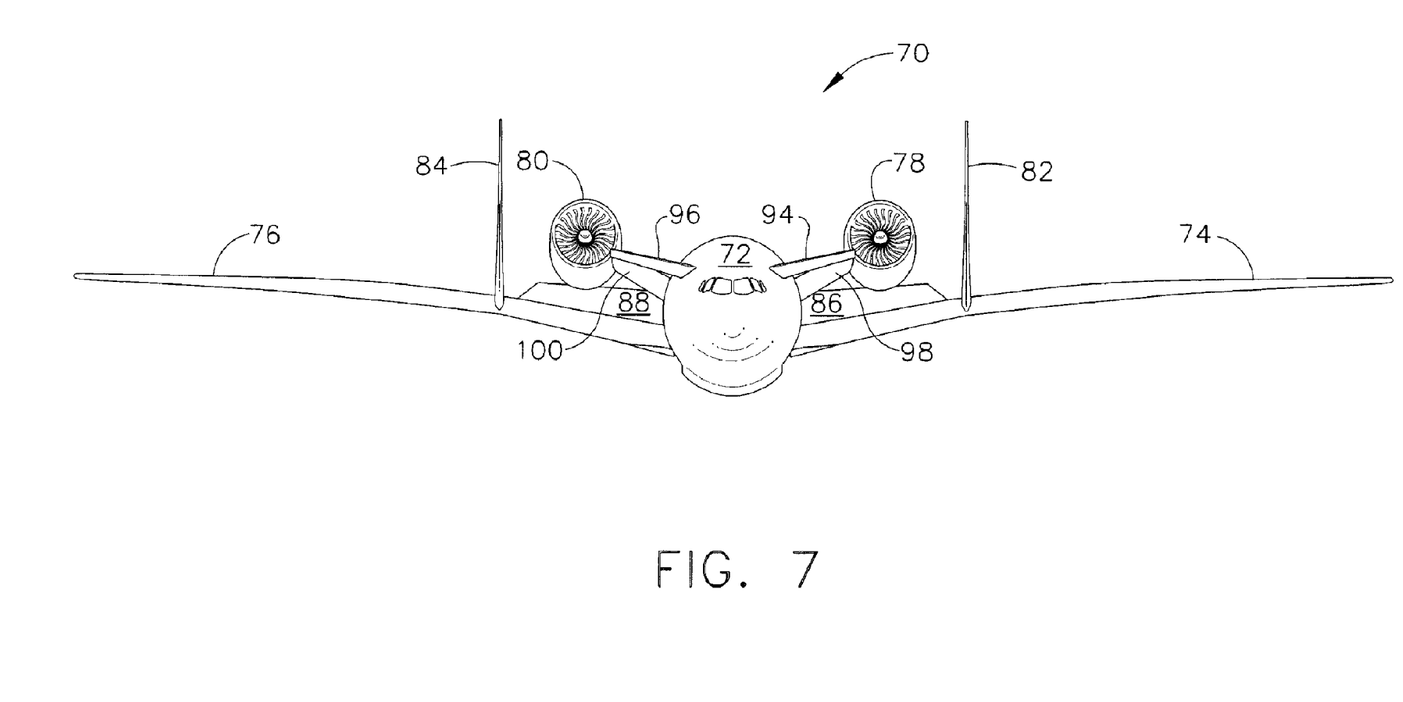
FIG. 7 is a front elevation view of the airplane of FIG. 5.
Figure 8:
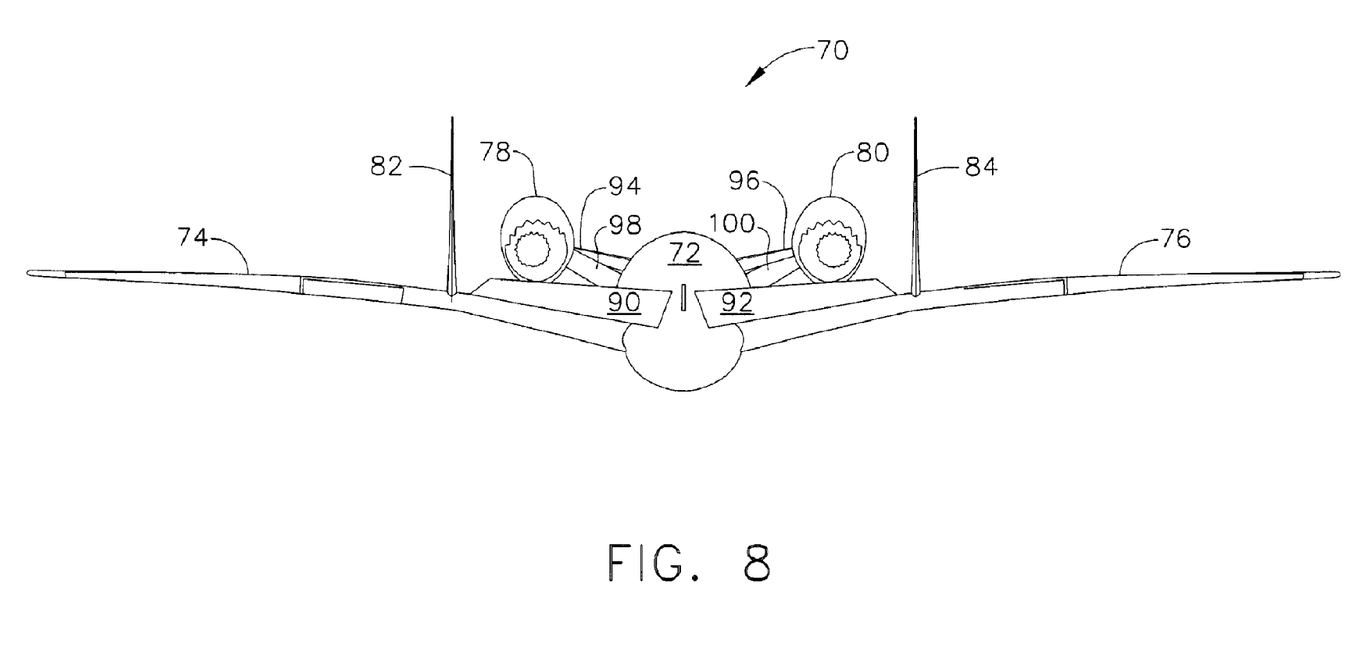
FIG. 8 is a rear elevation view of the airplane of FIG. 5.
Figure 9:
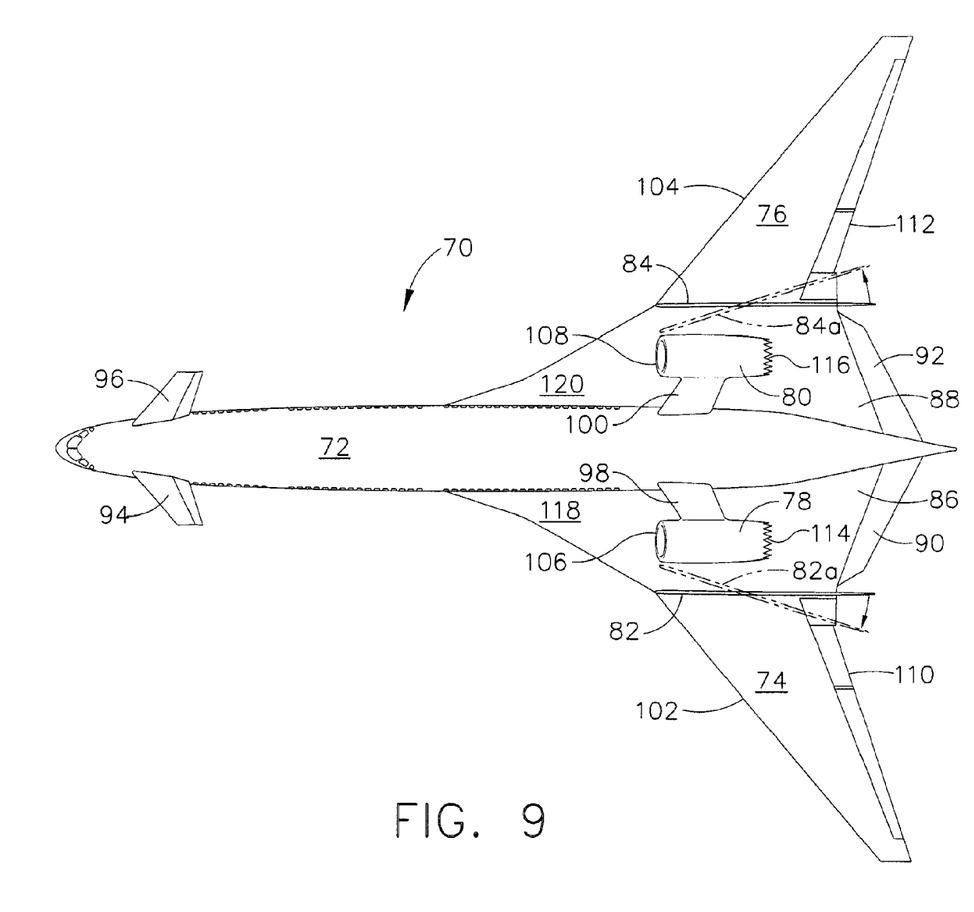
FIG. 9 is a top plan view of an alternative configuration of the airplane of FIG. 5.
Figure 10:
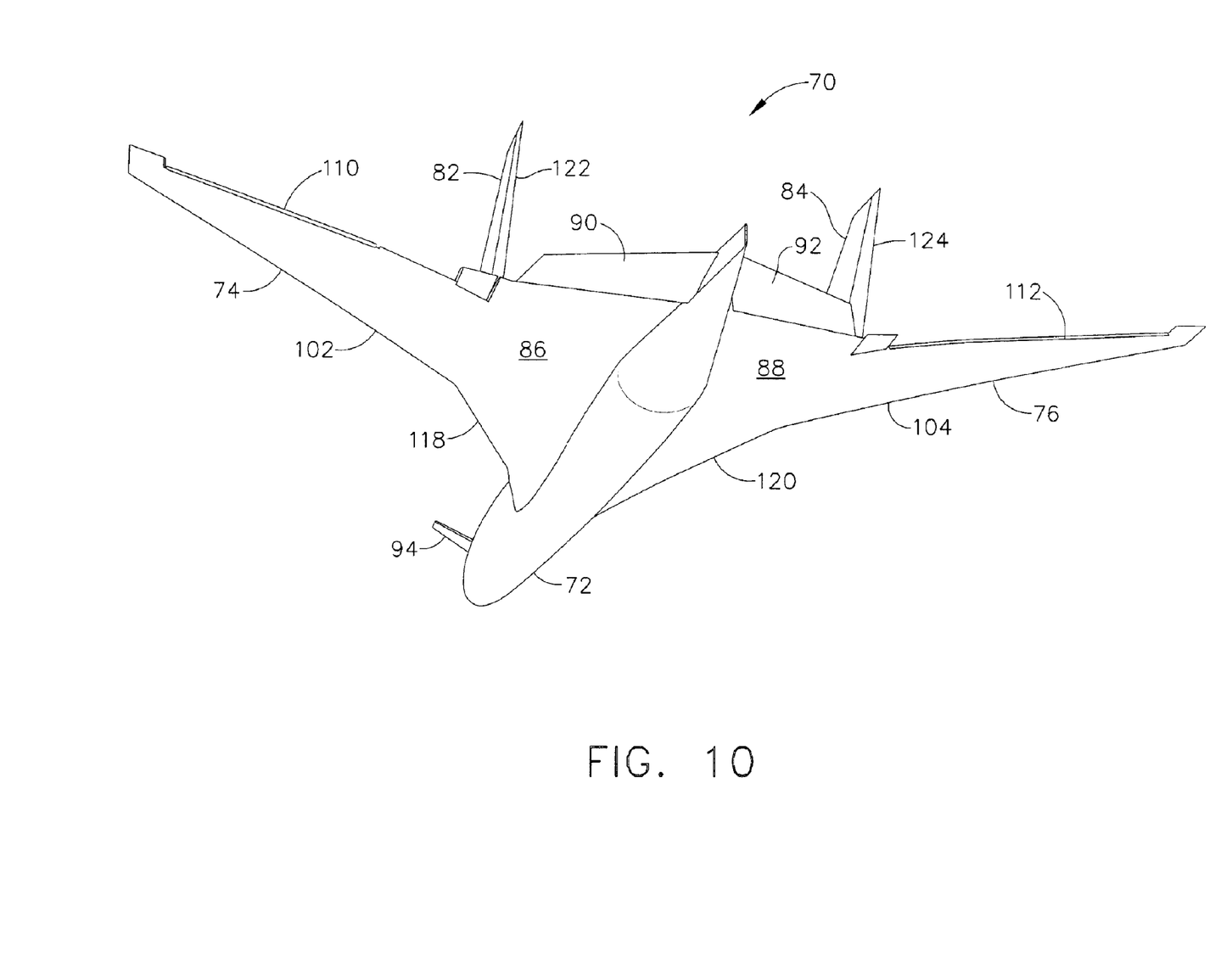
FIG. 10 is an upward perspective view of the airplane of FIG. 8.

The relative positions of the engines 78, 80 and wings 74, 76 may be selected to shield noise and heat from the ground to the degree possible while maintaining desired flight characteristics of the aircraft 70. As best shown in FIG. 6 the leading edge 102, 104 of the wing 74, 76 extends ahead of the intakes 106, 108 of the engine 78, 80 and the trailing edge 110, 112 of each wing 74, 76 extends past the engine exhausts 114, 116 to achieve the effect shown in FIG. 3. To accomplish this configuration, a delta wing design is desirable. A wing strake 118, 120 is provided at each leading edge 102, 104 of each wing 74, 76 near the fuselage 72, causing the wings 74, 76 to extend ahead of the engines' intakes 106, 108 for forward shielding. The wings 74, 76, fuselage 72, and strakes 118, 120 shield forward heat radiation from engine intake 106, 108 anti-icing systems. As shown in FIGS. 6 and 9, nacelle chevrons are shown in jagged line at the engine exhausts 114, 116. Nacelle chevrons are similarly shown in FIG. 13.

Outboard of each outermost engine is a vertical stabilizer 82, 84. The vertical stabilizers 82, 84 shield lateral travel of noise and heat, and may include rudders 122, 124 for directional control. As shown, the vertical stabilizers 82, 84 are taller than the uppermost point of the nacelles of the engines 78, 80, but the height may be as selected by one of ordinary skill in the art. One criterion may be for the vertical stabilizer 82, 84 to extend at least as high as the longitudinal axis of the highest engine, as measured at that engine's lowest point. In the embodiment shown, the vertical stabilizers 82, 84 are located at the intersection of the wing strake 118, 120 and the remainder of the wing 74, 76, and extend from the leading edge 102, 104 of each wing 74, 76 to the trailing edge 110, 112. The vertical stabilizers can be fixed with movable yaw-control surfaces or can be wholly rotating, in which case they can also be rotated 82a, 84a in a partial (or completely perpendicular) attitude with the freestream, as shown in FIG. 9, to provide additional drag and braking during runway deceleration after touch-down.

The aft deck, in two portions 86, 88 is an extension of the central rear portion of the wings 74, 76. The pitch control surface 90, 92 includes an elevator on each portion 86, 88 of the aft deck. The elevators 86, 88 may be non-structural devices. Rotating the pitch control surface 90, 92 upward, as may best be seen in FIG. 10, blocks line of sight to the engines and provides the effect of blocking and reflecting noise and heat as shown in FIG. 4. The pitch control surface 90, 92 may extend approximately the entire distance between the fuselage and each vertical stabilizer 82, 84.

Figure 11:
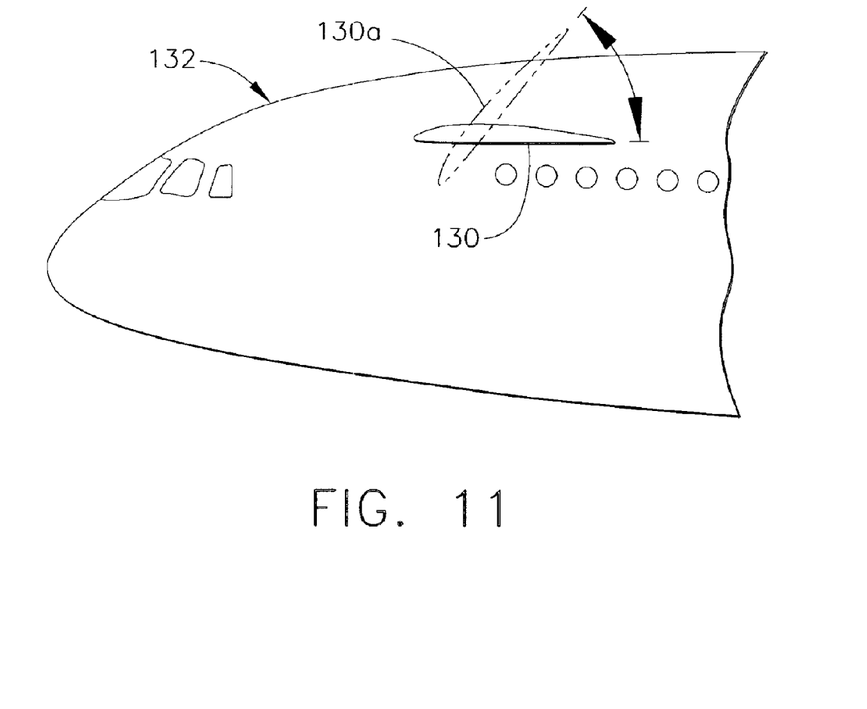
FIG. 11 is a side elevation view of a portion of an airplane and a canard in accordance with an embodiment of the present invention.
Figure 12:
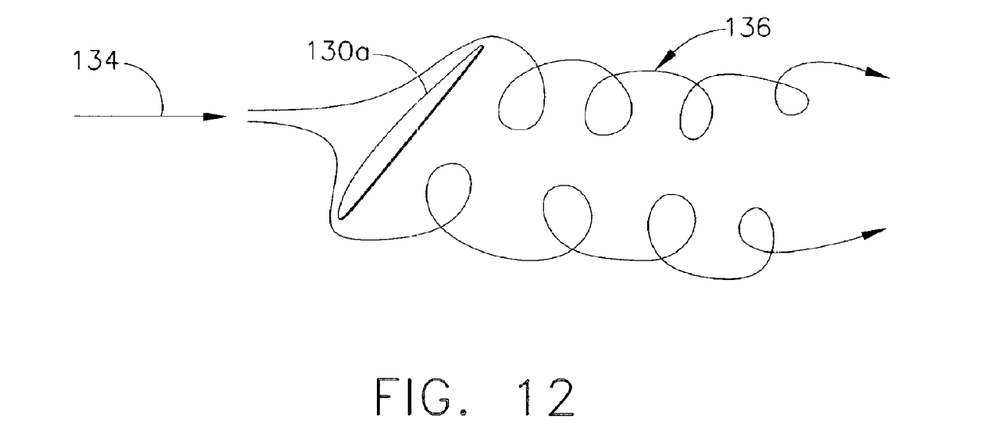
FIG. 12 is a side elevation view of the canard of FIG. 11, showing operational characteristics.

Canards 94, 96 provide vertical lift at the front of the aircraft 70. The canards may be mounted higher than the longitudinal axis of the aircraft 70, as shown, or lower than the axis. The canards may be, for example, straight, forward or rearward swept, dihedral, span or tip treated, fixed with hinged control surface, or fully rotatable, all flying. A fixed canard with a hinged control surface is analogous to a typical fixed wing with movable leading or trailing edges. A fully rotatable, all flying canard is a design whereby the entire canard rotates about a central axis that is horizontal or nearly horizontal and extends laterally from the fuselage, providing significant control authority. FIGS. 11 and 12 show a fully rotatable, all flying canard 130 mounted to an aircraft 132, rotated to be at an angle to the freestream 134 at an orientation 130a. Such a canard could potentially be used as a braking device during runway deceleration. The span and design of the canard tip may be chosen specifically so that tip vortices are either greatly mitigated or managed such that there is minimal risk of vortex ingestion into the engines. A high mount canard may feature an articulated design that folds out of the way of the passenger boarding bridge, and a low-mount canard design may be tailored (for example, with a slight anhedral degree) so that it slips in under the passenger boarding bridge.

Figure 13:
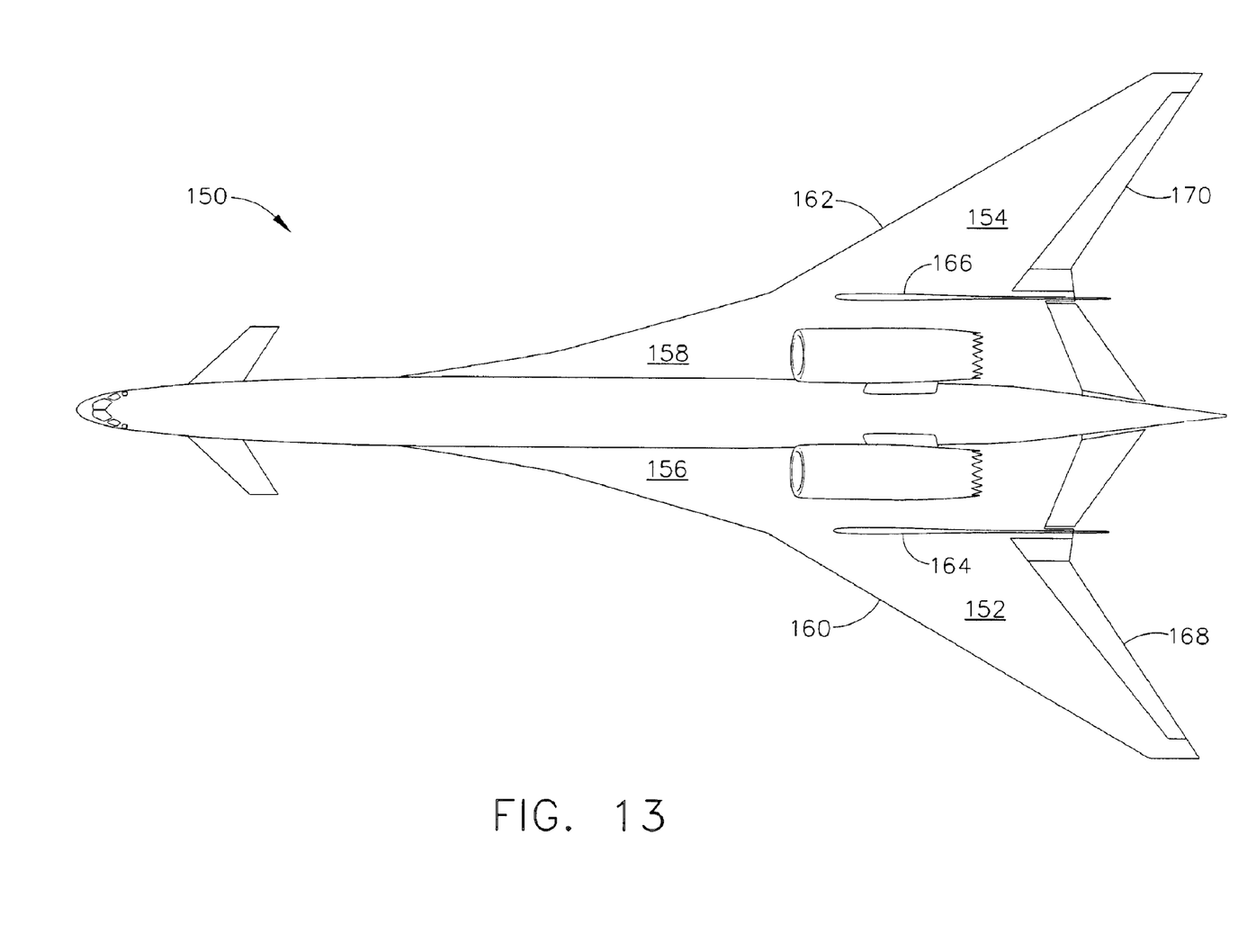
FIG. 13 is a top plan view of an airplane in accordance with another embodiment of the present invention.

FIG. 13 shows an embodiment of a supersonic aircraft 150 according to the present invention. These features may also be applied to subsonic aircraft. The supersonic design may present a configuration that can simultaneously reduce community noise, infra-red radiation, and sonic boom experienced by the ground. The reduction of shock wave propagation from the propulsion system is largely a benefit during high-speed climb and cruise. The wings 152, 154 may have increased sweep and larger strakes 156, 158 as compared to a subsonic design 118, 120. The leading edges 160, 162 of the wings 152, 154 may extend fore of the vertical stabilizers 164, 166, and the trailing edges 168, 170 of the wings 152, 154 may extend aft of the vertical stabilizers.

Specific embodiments of an invention are described herein. One of ordinary skill in the aerospace field will recognize that the invention may be applied in a variety of aircraft designs. In fact, many embodiments and implementations are possible. This application is intended to cover any adaptations or variations of the present invention. The following claims are in no way intended to limit the scope of the invention to the specific embodiments described.

What is claimed is:

1. A non-blended wing body aircraft comprising:
   a tubular fuselage;
   two wings with two wing strakes mounted to the tubular fuselage, the wings and strakes in a substantially delta wing configuration and each including a leading edge and a top surface, the wings each including a trailing edge;
   a plurality of shrouded turbofan engines, each engine with a nacelle mounted to the aircraft, each engine and nacelle completely and directly above the respective wing, strake, or a combination thereof, each nacelle including a leading end, a trailing end, a top, and a bottom;
   a vertical stabilizer mounted on each wing outboard of each respective outermost engine and nacelle at a vertical stabilizer mounting location; and
   a split aft deck including a trailing edge and a multi-element upwardly rotatable pitch control surface including a trailing edge at the trailing edge of the deck,
   wherein the mounting location of each vertical stabilizer to the respective wing is lower than the bottom of the respective nacelle and each vertical stabilizer extends at least as high as the top of the respective nacelle,
   wherein the leading edge of each strake extends forward of the respective nacelle leading end at least a distance as great as the distance from the top surface of the respective wing to the top of the respective nacelle,
   wherein the trailing edge of the aft deck extends aft of the respective nacelle trailing end at least a distance as great as the distance from the top surface of the respective wing to the top of the respective nacelle,
   wherein the fuselage extends between the nacelles and there is no central vertical stabilizer between the nacelles, the fuselage including a tail, and
   wherein forward, underneath, lateral, and aft shielding of engine noise and infrared radiation are provided.

2. The aircraft of claim 1, further comprising a close-out of the fuselage forward of the engines, and an engine support structure, wherein the support structure for the engines extends into the fuselage.

3. The aircraft of claim 1, wherein at least two shrouded turbofan engines with nacelles are mounted to the wings directly through pylons.

4. The aircraft of claim 1, wherein the vertical stabilizers extend from the leading edge to the trailing edge of the wing.

5. The aircraft of claim 1, wherein the leading edge of the wings extends fore of the vertical stabilizers.

6. The aircraft of claim 1, wherein the trailing edge of the wings extends aft of the vertical stabilizers.

7. The aircraft of claim 1, wherein the vertical stabilizers may be rotated about a vertical or approximately vertical axis.

8. The aircraft of claim 1, wherein the leading end of the vertical stabilizers terminates at the outermost extent of the wing strake.

9. The aircraft of claim 1, wherein the fuselage includes locations of passenger egress only forward of the intersection of the leading edge of the wing strake and the fuselage.

10. The aircraft of claim 1, wherein the upwardly rotatable pitch control surface extends on each side of the fuselage approximately from the fuselage to the vertical stabilizer.

11. The aircraft of claim 1, wherein a portion of the fuselage aft of the engines is used for cargo.

12. The aircraft of claim 1, wherein the cross-sectional shape of the fuselage is substantially a circle.

13. The aircraft of claim 1, wherein the cross-sectional shape of the fuselage is substantially an ellipse.

14. The aircraft of claim 1, wherein the trailing edge of the aft deck is fixed, wherein the vertical stabilizer has a trailing edge that is moveable, wherein the trailing edge of the moveable vertical stabilizer trailing edge at the mid-chord of the movable vertical stabilizer is substantially two nacelle trailing end diameters downstream of the nacelle trailing end.

15. The aircraft of claim 1, wherein the upward rotatable pitch control surface has an average chord of from one half of one nacelle trailing end diameter to one nacelle trailing end diameter.

16. The aircraft of claim 1, wherein the minimum separation between the lower surface of the nacelle and the upper surface of the aft deck is no greater than one half of the nacelle trailing end diameter.

17. The aircraft of claim 1, wherein the upwardly rotatable pitch control surface at the trailing edge of the aft deck is connected to the aft deck at a hinge-line, and wherein the hinge-line has a span that extends fully between the fuselage and the vertical stabilizer.

18. The aircraft of claim 1, further comprising canards with movable trailing edges, wherein the combined pitch authority of the canard and upward rotatable beaver tail sustains a body angle relative to horizon of substantially 20 degrees at maximum takeoff weight.

19. The aircraft of claim 1, further comprising canards with movable trailing edges, wherein there is a nacelle on each side of the fuselage, and wherein the distance between the canard movable trailing edges and the and the leading ends of the nacelles is substantially 11 nacelle trailing end diameters.

20. The aircraft of claim 1, further comprising canards with movable trailing edges, wherein during landing or approach to landing the movable trailing edges of the canards are rotated upward, providing incremental forward engine noise shielding.

21. The aircraft of claim 1, wherein a separation between the bottom of the nacelle and the upper surface of the wing substantially equivalent to one-half of the trailing end diameter prevents strake leading edge vortices from being ingested by the engine.

22. The aircraft of claim 1, further comprising a canard mounted to each side of the fuselage, wherein there is one engine and one nacelle on each side of the fuselage, and wherein the span of the canard is at least equal to the distance between the nacelles to prevent canard tip vortices from being ingested by the engines.

23. The aircraft of claim 1, wherein the vertical stabilizers each have a trailing edge that is moveable, wherein the moveable trailing edges of the vertical stabilizer each have a root where the moveable trailing edges meet the aft deck, wherein the upwardly rotatable pitch control surface at the trailing edge of the aft deck is connected to the aft deck at a hinge-line, and wherein when the movable trailing edges of the vertical stabilizers are coplanar with the remainder of the vertical stabilizers, the roots of the trailing edges of the moveable trailing edge of the vertical stabilizers are coincident with the upward rotatable beaver tail hinge-line to provide substantially uniform lateral and downward radiation shielding of reflected sound and heat energy.

24. The aircraft of claim 1, wherein the distance between the upward rotatable pitch control surface trailing edge and the most downstream point of the engine or nacelle is more than two and one half times the nacelle trailing end diameter.

25. The aircraft of claim 1, wherein the aft part of the fuselage that extends downstream of the engines provides incremental jet plume noise and infrared radiation shielding from the engine on the opposite side of the fuselage from observers to the side of the flight path.

26. The aircraft of claim 1, wherein the trailing edge of the aft part of the fuselage that extends downstream of the engines extends more than 4 nacelle trailing end diameters downstream of the nacelle trailing end.

27. The aircraft of claim 1, wherein each shrouded turbofan engine includes a propulsor and wherein the fuselage extends aft of the propulsors.

28. The aircraft of claim 1, wherein the fuselage extends aft of the trailing edge of the multi-element pitch control surface.

29. The aircraft of claim 1, wherein the each nacelle is mounted to the fuselage with a pylori, and wherein only the fuselage and the pylons are between the nacelles.

30. The aircraft of claim 1, wherein the multi-element pitch control surface in conjunction with the tail interactively capture and reflect noise and infrared radiation energy.

31. The aircraft of claim 1, wherein each shrouded turbofan engine includes a propulsor and wherein the fuselage extends fully longitudinally between the propulsors.

32. The aircraft of claim 31, wherein the plurality of engines is mounted to the fuselage.

33. The aircraft of claim 1, wherein the upward rotatable pitch control surface reduces the chord of the aft deck necessary to achieve the substantially the same magnitude of noise shielding by the relationship of the chord of the upwardly rotatable pitch control surface times the cosine of deflection angle of the upwardly rotatable pitch control surface.

34. The aircraft of claim 33, wherein infrared radiation from the jet plume that a man-portable air defense system unit could see is blocked laterally, underneath, and behind the aircraft.

35. The aircraft of claim 1, further comprising canards.

36. The aircraft of claim 35, wherein the fuselage has a central axis and wherein the canards are mounted above the central axis of the fuselage.

37. The aircraft of claim 35, wherein the fuselage has a central axis and wherein the canards are mounted below the central axis of the fuselage.

38. The aircraft of claim 35, wherein the canards are rotatable about a horizontal or approximately horizontal axis that extends laterally from the fuselage.

39. A non-blended wing body aircraft comprising:
a fuselage including an area-ruled section;
an integrated aerodynamic structural surface mounted to the area-ruled section of the fuselage including strakes each including a leading edge, a split aft deck including a trailing edge, and intermediate surfaces extending between the strakes and aft deck, the aerodynamic structural surface including a top surface;
a plurality of vertical stabilizers laterally spaced from the fuselage and mounted to the aerodynamic structural surface at vertical stabilizer mounting locations;
a multi-element upwardly rotatable pitch control surface, including a trailing edge, at the trailing edges of the aerodynamic structural surface;
two wings mounted to the aerodynamic structural surface outboard of the vertical stabilizers; and
a plurality of shrouded turbofan engines each with a nacelle, wherein the engines with the nacelles are mounted to the aircraft and the engines and the nacelles are completely and directly above the aerodynamic structural surface, and each nacelle includes a leading end, and trailing end, a top, and a bottom, wherein the mounting locations of the vertical stabilizers to the aerodynamic structural surface are lower than the bottom of any nacelle and each vertical stabilizer extends at least as high as the top of any nacelle, wherein the leading edges of the strakes extend forward of the leading ends of the nacelles at least a distance as great as the distance from the top surface of the aerodynamic structural surface to the top of the nacelles, wherein the trailing edges of the aft decks extend aft of the trailing ends of the nacelles at least a distance as great as the distance from the top surface of the aerodynamic structural surface to the top of the nacelles, wherein the fuselage extends between the nacelles and there is no central vertical stabilizer between the nacelles, the fuselage including a tail, and wherein the configuration of the fuselage, aerodynamic structural surface, engine, and nacelle provides forward, underneath, lateral, and aft shielding of noise, infrared radiation, and sonic boom.

40. The aircraft of claim 39, wherein the trailing edge spans of the upwardly rotatable pitch control surfaces extend laterally outward approximately from the fuselage at least as far as the outermost point of the nacelles.

41. The aircraft of claim 39, wherein the trailing edge spans of the upwardly rotatable pitch control surfaces extend laterally outward approximately from the fuselage to approximately the vertical stabilizer.

42. The aircraft of claim 39, wherein each shrouded turbofan engine includes a propulsor and wherein the fuselage extends fully longitudinally between the propulsors.

43. The aircraft of claim 39, wherein the fuselage extends aft of the trailing edge of the multi-element pitch control surface.

44. The aircraft of claim 39, wherein the each nacelle is mounted to the fuselage with a pylori, and wherein only the fuselage and the pylons are between the nacelles.

45. The aircraft of claim 39, wherein the multi-element pitch control surface in conjunction with the tail interactively capture and reflect noise and infrared radiation energy.

46. The aircraft of claim 39, wherein the multi-element pitch control surface in conjunction with the tail interactively capture and reflect noise and infrared radiation energy.

47. The aircraft of claim 39, wherein each shrouded turbofan engine includes a propulsor and wherein the fuselage extends aft of the propulsors.

48. The aircraft of claim 39, further comprising a close-out of the fuselage forward of the engines, and an engine support structure, wherein the support structure for the engines extends into the fuselage.

49. The aircraft of claim 48, wherein a portion of the fuselage aft of the engines is used for cargo.

50. A method of making a non-blended wing body aircraft with reduced aircraft noise, infrared radiation, or sonic boom, or a combination thereof, emitted towards the ground from the aircraft in flight, the method comprising:

providing a tubular fuselage;

mounting two wings with two wing strakes to the tubular fuselage, the wings and strakes in a substantially delta wing configuration and each including a leading edge and a top surface, the wings each including a trailing edge;

providing a plurality of shrouded turbofan engines, each engine with a nacelle, and mounting each nacelle to the aircraft, each engine and nacelle completely and directly above the respective wing, strake, or a combination thereof, each nacelle including a leading end, a trailing end, a top, and a bottom;

mounting a vertical stabilizer mounted on each wing outboard of each respective outermost engine and nacelle at a vertical stabilizer mounting location; and providing a split aft deck including a trailing edge and a multi-element upwardly rotatable pitch control surface at the trailing edge of the deck, wherein the mounting location of each vertical stabilizer to the respective wing is lower than the bottom of the respective nacelle and each vertical stabilizer extends at least as high as the top of the respective nacelle, wherein the leading edge of each strake extends forward of the respective nacelle leading end at least a distance as great as the distance from the top surface of the respective wing to the top of the respective nacelle, wherein the trailing edge of the aft deck extends aft of the respective nacelle trailing end at least a distance as great as the distance from the top surface of the respective wing to the top of the respective nacelle, wherein the fuselage extends between the nacelles and there is no central vertical stabilizer provided between the nacelles, the fuselage including a tail, and wherein forward, underneath, lateral, and aft shielding of engine noise and infrared radiation are provided.

* * * * *

UNITED STATES PATENT AND TRADEMARK OFFICE
CERTIFICATE OF CORRECTION

| | |
|---|---|
| PATENT NO. | : 8,016,233 B2 |
| APPLICATION NO. | : 11/307271 |
| DATED | : September 13, 2011 |
| INVENTOR(S) | : Matthew D. Moore et al. |

It is certified that error appears in the above-identified patent and that said Letters Patent is hereby corrected as shown below:

Column 8, line 20 that is in claim 29, and column 9, line 39 that is in claim 44, the text "pylori", each occurrence, should read --pylon--.

Signed and Sealed this
Twenty-second Day of November, 2011

David J. Kappos
*Director of the United States Patent and Trademark Office*